(12) United States Patent
Schwartz et al.

(10) Patent No.: US 7,383,207 B2
(45) Date of Patent: Jun. 3, 2008

(54) DIGITAL CONTENT PRICING APPARATUS

(75) Inventors: Todd A. Schwartz, Portland, OR (US);
Bruce D. Bridges, Beaverton, OR (US); Richard J. Qian, Camas, WA (US); Vaughn S. Iverson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1239 days.

(21) Appl. No.: 10/027,420

(22) Filed: Dec. 20, 2001

(65) Prior Publication Data

US 2003/0120551 A1    Jun. 26, 2003

(51) Int. Cl.
*G06Q 30/00* (2006.01)
(52) U.S. Cl. ...................................................... 705/26
(58) Field of Classification Search ................ 705/26, 705/27; 709/219
See application file for complete search history.

(56) References Cited

U.S. PATENT DOCUMENTS

| | | | |
|---|---|---|---|
| 6,725,257 B1 * | 4/2004 | Cansler et al. | 709/219 |
| 2002/0144275 A1 * | 10/2002 | Kay et al. | 725/87 |
| 2002/0161713 A1 * | 10/2002 | Oh | 705/52 |
| 2003/0005452 A1 * | 1/2003 | Rodriguez | 725/86 |

FOREIGN PATENT DOCUMENTS

KR    2001103537 A   * 11/2001

OTHER PUBLICATIONS

Author unknown, "Salon Reports Fourt Quarter Fiscal 2001 Results," PR Newswire, New York, May 15, 2001, p. 1.*

* cited by examiner

*Primary Examiner*—Yogesh C. Garg
*Assistant Examiner*—Amee A. Shah
(74) *Attorney, Agent, or Firm*—Schwegman, Lundberg & Woessner, P.A.

(57) ABSTRACT

An apparatus, a system, an article including a machine-accessible medium, and methods for pricing digital content are disclosed. The digital content pricing apparatus may include a sales computer and a memory used to retain digital content items associated with a base price and one or more option prices, along with a final price related to the base and option prices by a final pricing formula. The method may include selecting a digital content item and at least one configuration option associated with the item, calculating the item price using appropriate adjustment factors, and calculating the final price using a final pricing formula. Pricing information, in the form of prices, adjustment factors, and formulae may be defined in meta-data descriptors included in the digital content.

7 Claims, 3 Drawing Sheets

DIGITAL CONTENT PRICING APPARATUS

RELATED APPLICATIONS

This application is related to co-pending application Ser. No. 09/745,323, now U.S. Pat. No. 6,938,005, titled "Digital Content Distribution," filed on Dec. 21, 2000, which is commonly assigned to the assignee of the present invention.

FIELD OF THE INVENTION

The present invention relates generally to the packaging and distribution of digital content products. More particularly, the present invention relates to apparatus and methods for configuring, packaging, and pricing digital content products for distribution.

BACKGROUND INFORMATION

Networks have now begun to acquire the reputation for stability and security necessary to support increasing levels of consumer purchasing activity. In line with the growth in electronic commerce is the increasing availability of products which include digital content, such as digital music, on-line books, documents, software, and data.

Most of the available digital content products, especially those purchased and distributed electronically, have a fixed configuration, or at best, a fairly limited number of alternatives. Each of the available configurations is built ahead of the time it is needed, with the consumer choosing from a limited list of the offerings at the point of purchase. While it may be possible to build individually-selected configurations on an as-needed basis, such activity tends to use more computing resources than the commonly available "point-and-click" downloading process.

Examples of this set of circumstances abound. CD ROMs are typically supplied in an album configuration, including a fixed number of songs; usually from 10-15. Software packages are configured as an "office", including word processing, spreadsheet, presentation, publishing, and other programs, possibly offered in a "Professional" version in addition to the "Basic" version. Various collections of games are bundled into packages. In each case, the potential consumer has either no choice, or a very limited choice of alternatives made available at a fixed price, ultimately resulting in no sale for the distributor, or a purchasing consumer that ends up buying more than he wants or needs.

Limited numbers of product configurations are preferred for several reasons. The chief among these being that inventory costs are less; a distributor needs only to manage a limited number of stock keeping units (SKUs), linked to some number of pricing options. Not only is there overhead associated with each SKU, which is unique to a particular product configuration, but a limited number of SKUs also makes it easier for humans to understand and deal with customer support issues, including software upgrades, for example.

Therefore, there is a need in the art for an apparatus, an article including a machine-accessible medium, a system, and a method of configuring and pricing digital content which provides the flexibility desired by consumers, without generating an inordinate amount of unique configuration information which is difficult to assimilate, process, and maintain. Thus, such an apparatus, article, system and method should operate to generate a large number of potential configurations using a minimal starting data set. In addition, it would be desirable to retain configuration information as an integral part of each generated configuration, in order to simplify upgrade and/or additional purchase activity.

DESCRIPTION OF THE EMBODIMENTS

Figure 1:
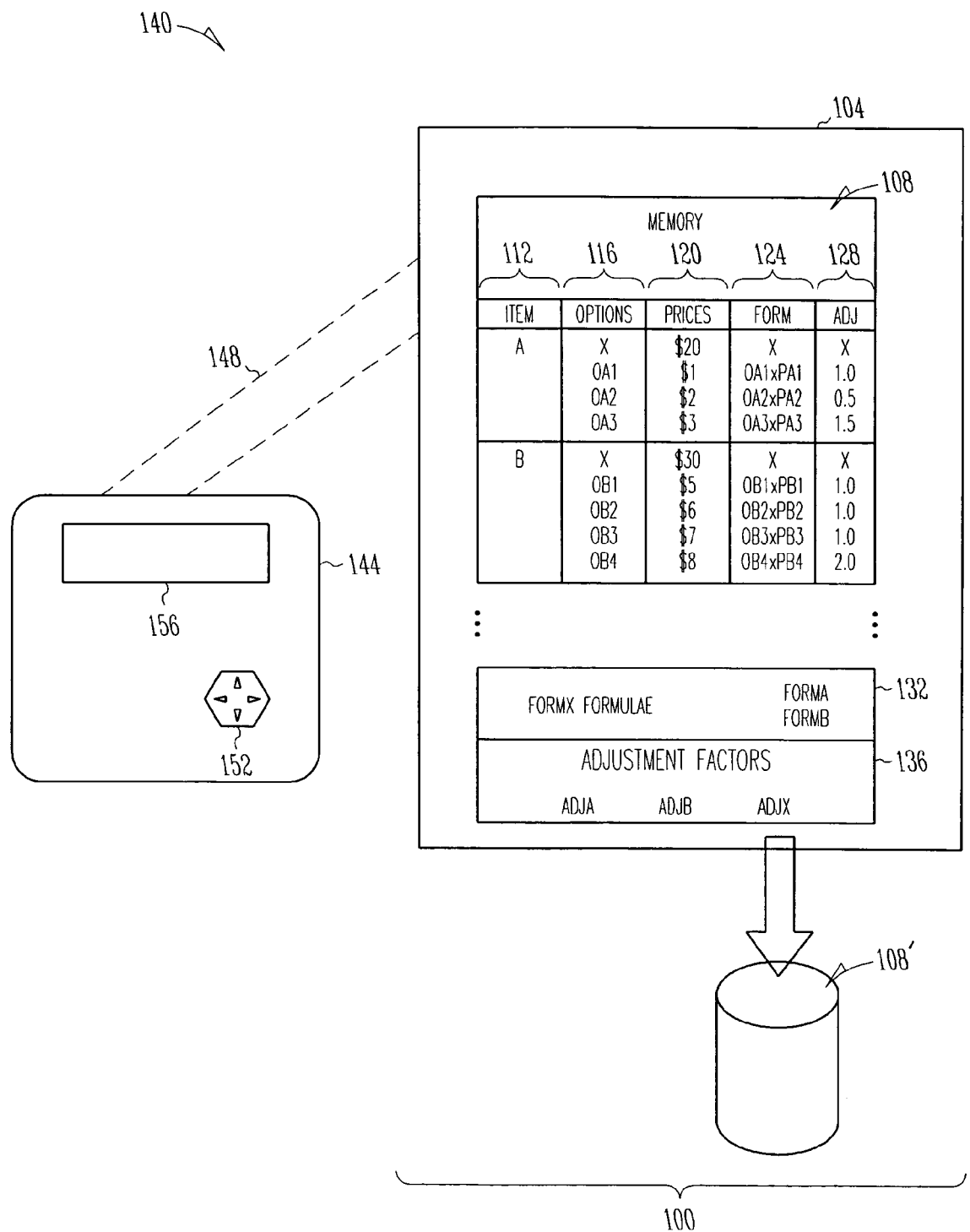
FIG. 1 is a block diagram of an apparatus, an article including a machine-accessible medium, and a system according to various embodiments of the present invention.

In the following detailed description of the invention, reference is made to the accompanying drawings which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in the art to practice the invention. Other embodiments may be utilized and derived therefrom, such that structural and logical substitutions and changes may be made without departing from the scope of the invention. The following detailed description, therefore, is not to be taken in a limiting sense, and the scope of the invention is defined only by the appended claims, along with the full range of equivalents to which such claims are entitled.

FIG. 1 is a block diagram of an apparatus, an article including a machine-accessible medium, and a computer according to various embodiments of the present invention. In one embodiment of the invention, the digital content pricing apparatus 100 may include a sales computer 104 and a memory 108, 108' capable of being communicatively coupled with the sales computer 104. As shown, the memory 108 may be an internal memory 108 for the computer 104, or an external memory device 108' (e.g., a remote computer, a Universal Description, Discovery, and Integration (UDDI) repository, etc.). The memory 108 may include a plurality of digital content items 112, which may represent on-line novels, software program packages, compact disks, electronic music albums, electronic magazines, movie packages (e.g., similar to or identical to the program content stored on a digital video disk), electronic news services, and similar items.

Each one of the digital content items 112 may be associated with a number of options 116, prices 120 corresponding to each item and each option, formulae 124 corresponding to the options, and option adjustment factors 128. Options may include, for example, paying less for an item if advertising is included, paying more for a higher-quality recording or supplemental content, etc. Thus, each item may be associated with a base price and one or more item configuration options, each associated with an option price. For example, item A may be associated with a base price of $20, and three options OA1, OA2, and OA3, which cost $1, $2, and $3, respectively, prior to any adjustments.

Each one of the digital content items 112 may also be associated with an item price related to the base price and one or more option prices by an item pricing formula. For example, as shown in FIG. 1, item A may be associated with various pricing formulae, including an item pricing formula, FORMA, such that the total price for item A is:

$$FORMA::=ITEMPRICEA=ADJA*[BASEA+(OA1*PA1)+(OA2*PA2)+(OA3*PA3)].$$

Assuming all options are purchased, the ITEMPRICEA is $29.15 if ADJA=1.10, BASEA=$20, OA1=$1, PA1=1.0, OA2=$2, PA2=0.5, OA3=$3, and PA3=1.5. BASEA is the item A base price of $20. The factor ADJA is an item price adjustment factor for item A (selected from a plurality of adjustment factors 136), the values OA1, OA2, and OA3 are prices for individual options associated with item A, and the factors PA1, PA2, and PA3 are option-specific price adjustment factors associated with the options OA1, OA2, and OA3, respectively. Those skilled in the art will realize that the item price adjustment factor (i.e., ADJA) may be used to impose premium pricing (as in this example, where a premium of 1.1, or 110% is assessed), or a discount, if desired. All adjustment factors may be expressed as formulae themselves, and can be made arbitrarily complex, dependent on each other, and/or dependent on other variables assigned by the content vendor for items A and B.

It should be noted that the digital content product (e.g. item A) may be embodied in an electronic package, using a manifest document, such that multiple product configurations can be generated for the same package, as disclosed in U.S. patent application Ser. No. 09/745,323, titled "Digital Content Distribution", noted above, and incorporated herein by reference in its entirety. Thus, a set of configuration options may be declared for the package, and pricing information (e.g., similar to or identical to OA1, PA1, OA2, PB2, and OA3, PB3) may be specified in meta-data descriptors associated with each option available in conjunction with the digital content product. When the configuration choices are fully resolved, and the resulting package is generated, the final price can be determined by applying an item pricing formula (e.g., similar to or identical to FORMA), or a final pricing formula (see below), to the meta-data that remains in the resultant package for the product. In fact, the pricing formulae themselves can be specified in one or more meta-data descriptors associated with the product and its package.

Similarly, Item B may be directly associated with an item pricing formula FORMB, such that:

$$FORMB::=ITEMPRICEB=ADJB*[BASEB+(OB1*PB1)-(OB2*PB2)+(OB3*PB3)+(OB4*PB4)].$$

Assuming that only options OB1 and OB3 are purchased, the ITEMPRICEB is $37.80 if ADJB=0.9 (selected from a plurality of adjustment factors 136), BASEB=$30, OB1=$5, PB1=1.0, OB3=$7, and PB3=1.0. While OB2=$2, PB2=0.5, OB4=$8, and PB4=2.0, these values are not used in the item pricing formula FORMB, since the example assumes options OB2 and OB4 are not purchased. Thus, for example, if item B is a mechanical engineering society journal publication subscription, OB1 may be a monthly update of the society members, and OB3 may be a quarterly subscription to mechanical engineering software routines submitted by the members of the society for publication. The items not selected, OB2 and OB4 in this example, may represent a request to include advertising in the journal (which reduces the total subscription price in this case), and a request for updates to a mechanical engineering suppliers database distributed in the form of a compact disk on an annual basis, respectively.

Each of the digital content items 112 may be directly associated with an item pricing formula, as has been illustrated with respect to items A and B. In these cases, the item pricing formulae FORMA and FORMB are also the final pricing formulae (i.e., the price the consumer will pay for the entire purchase, assuming each item is purchased separately). However, using another example, there is also the possibility that the item pricing formulae FORMA and FORMB are not the same as the final pricing formula. In other words, the items A and/or B may only be directly related to the item pricing formula FORMA and FORMB, and be indirectly related to a final pricing formula, as may occur when several items are purchased, or certain combinations of items are purchased. In these instances, for example, a vendor may discount the individual item totals based on quantity purchases, or the purchase of a selected combination of options, based on an indirectly-associated final pricing formula. For example, one who purchases a quantity of at least six (6) of item A may receive a further discount of 5% (i.e. non-item specific adjustment factor ADJX selected from the plurality of non-specific adjustment factors 136) off of the entire purchase, thus:

$$FORMX::=FINALPRICE=0.95 \text{ [when number of items } A>5\text{]}* (ITEMPRICEA+ITEMPRICEB)$$
$$=\$63.60.$$

This is most likely to occur when the vendor has an overstock of certain item configurations, and discounting the price for overstock purchases is advantageous. This scenario is also common in promotional situations. Therefore, the memory 108 may include a plurality of pricing formulae 132, such as item pricing formulae (e.g., FORMA and FORMB), and one or more final pricing formulae (e.g., FORMX).

Thus, in the memory 108, 108', each of the digital content items 112 may be associated with a plurality of configuration options 116, including specific item configuration options, which are the options selected for actual purchase, as a subset of the available universe of options. For example, as noted above, while the universe of available configuration options for item B include OB1-OB4, the item configurations options (i.e., those chosen for purchase along with the item) were OB1 and OB3. One or more option adjustment factors 128 may be associated with each item configuration option. As noted above, for added versatility, each item pricing formula may include one or more item price adjustment factors selected from a plurality of non-specific adjustment factors 136. Additionally, each final pricing formula may include one or more non-item specific adjustment factors selected from the plurality of non-specific adjustment factors 136.

Item pricing formulae, final pricing formulae, option adjustment factors, and various non-specific factors may be selected and applied to specific purchases based upon one or more selected external factors to which they are related. Such external factors may includes circumstances unrelated to the purchase itself, including the time of day, the month, business conditions, the identity of the purchasing party, etc. However, as has been shown above, such external factors may also be selected according to the type of items purchases (i.e., how many different kinds of digital content items are selected), the quantity of each type of item purchased, the base price of each item purchased, and the price of one or more options associated with each item purchased, among others. Each of the prices, adjustment factors, and formulae may be expressed in the form of meta-data descriptors and incorporated into an electronic package for the digital content item.

As shown in FIG. 1, the invention may also be embodied as a digital content pricing system 140, which includes a sales computer 104, and a purchase computer 144 capable of being communicatively coupled with the sales computer. The coupling medium may be wireless (using electromagnetic energy), wired, fiber optic, or combinations thereof. The system 140 also include a memory 108, 108' capable of being communicatively coupled with the sales computer. The memory 108, 108' may operate as described above, so as to include one or more digital content items associated with a base price, one or more item configuration options associated with one or more option prices, and a final price (and/or item price) related to the base price and the option price(s) by a final pricing formula.

The purchase computer 144 may be communicatively coupled to an item selection device, such as a keypad, mouse, touch screen, or any other input device, including a microphone or video camera, which is capable of receiving item selection input from a user. The computer 144 may also include a display 156, specifically used to confirm purchase selections, including the types and quantities of items selected, the options selected, and results of pricing formula calculations applied to the purchase decision.

It should be noted that the sales computer 104, the memory 108, 108', and the purchase computer 144 may all be characterized as "modules" herein. Such "modules" may include hardware circuitry, such as a microprocessor and memory, software program modules, or firmware, and combinations thereof, as desired by the architect of the apparatus 100 and system 140, and appropriate for particular implementations of the invention.

One of ordinary skill in the art will understand that the apparatus and system of the present invention can be used in applications other than for computers, and thus, the invention is not to be so limited. The illustrations of an apparatus 100, a sales computer 104, and a system 140 are intended to provide a general understanding of the structure of the present invention, and are not intended to serve as a complete description of all the elements and features of apparatus, computers, and systems which might make use of the structures described herein.

Applications which may include the novel apparatus, computer, and system of the present invention include electronic circuitry used in high-speed computers, communication and signal processing circuitry, modems, processor modules, embedded processors, and application-specific modules, including multilayer, multi-chip modules. Such apparatus, computers, and systems may further be included as sub-components within a variety of electronic systems, such as televisions, cellular telephones, personal computers, personal digital assistants, radios, aircraft, and others.

Figure 2:
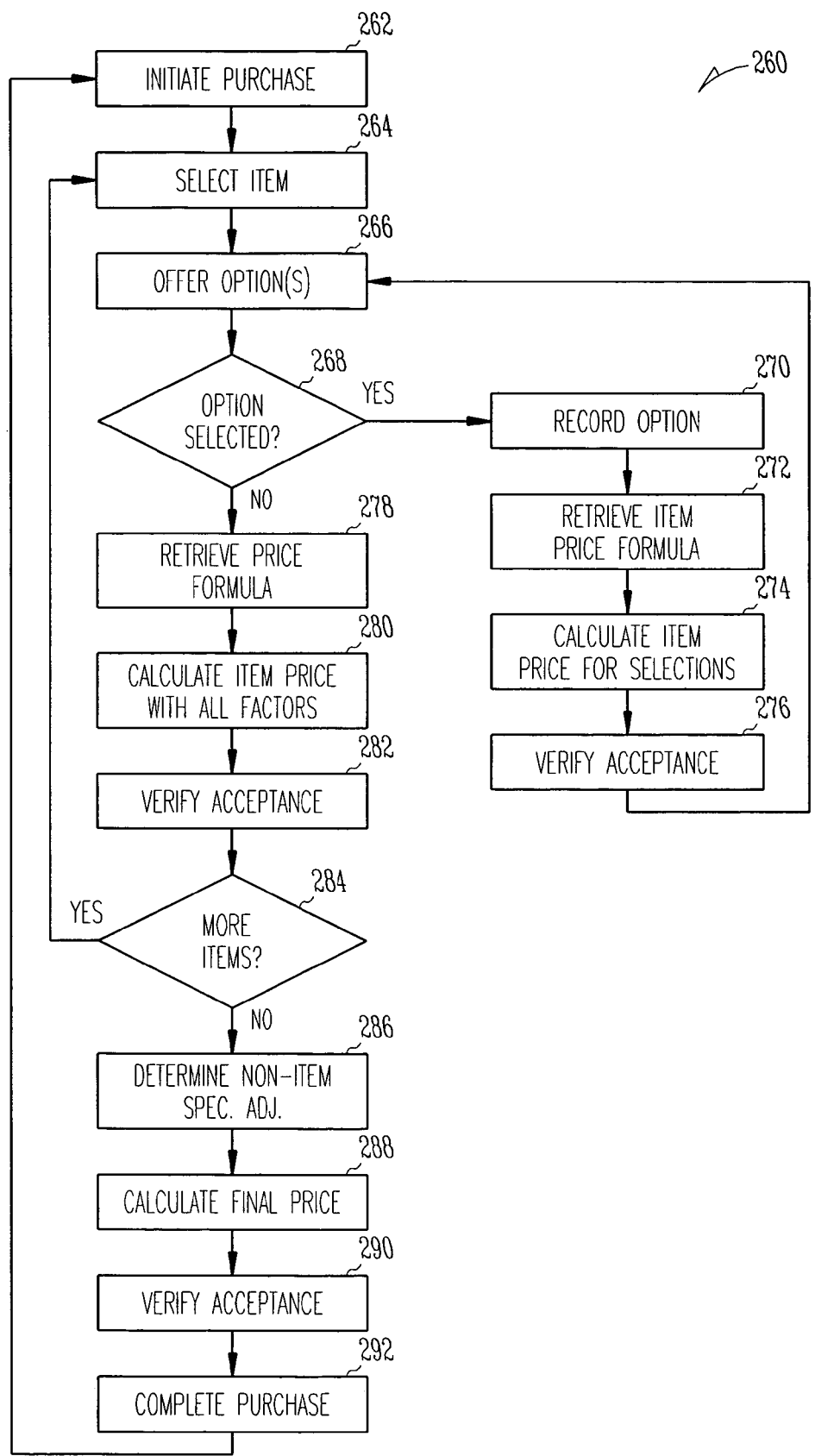
FIG. 2 is flow chart illustrating a method of pricing digital content according to an embodiment of the present invention.

FIG. 2 is flow chart illustrating a method of pricing digital content according to an embodiment of the present invention. The method 260 may include initiating a purchase transaction at block 262, such as entering a store housing the purchase computer, or approaching a ticket sales kiosk including the purchase computer. The method may continue with selecting a digital content item for purchase (e.g. an on-line magazine) associated with a base price at block 264. One or more purchase options are offered at block 266, and assuming that at least one option is selected, the selection may be recorded at block 270. Then, the formula for calculating the item price can be retrieved at block 272, and the item price can be calculated at block 274. During this portion of the process, the item base price and the option adjustment factors corresponding to the selected options may be retrieved and applied using the item pricing formula.

At this point, the user may be queried for acceptance of the item price at block 276, and further options may be selected, changed, or rejected by going back to block 266 in order to entertain further decisions regarding the available options for the selected item.

If no options are selected, or no further options are selected at block 268, then the item pricing formula will be retrieved (if necessary) at block 278, and applied to the base price of the digital content item, along with any option adjustment factors for all selected options (if any), and item adjustment factors (e.g. individual item discounts) at block 280. Acceptance by the user may be sought at block 282, if desired, and the opportunity to select additional items may be offered at block 284. If more items are to be selected, then the process may continue with additional item selection at block 264. If no more items are to be selected, then the process may continue with determining non-item specific adjustment factors (e.g., via calculation, or be retrieving them from a lookup table) at block 286, and then calculating a final price for all items selected, along with their options, at block 288. Acceptance by the purchaser may be verified at block 290, if desired, and then the transaction may be completed at block 292. If desired, additional purchases may be made by initiating a new purchase at block 262.

The method may also include the incorporation of meta-data descriptors and electronic packaging in combination with the digital content products, as described above. Thus, the method may include specifying pricing information for one or more options associated with the digital content using a corresponding number of meta-data descriptors, and/or specifying a final pricing formula in a meta-data descriptor associated with the digital content, for example.

Figure 3:
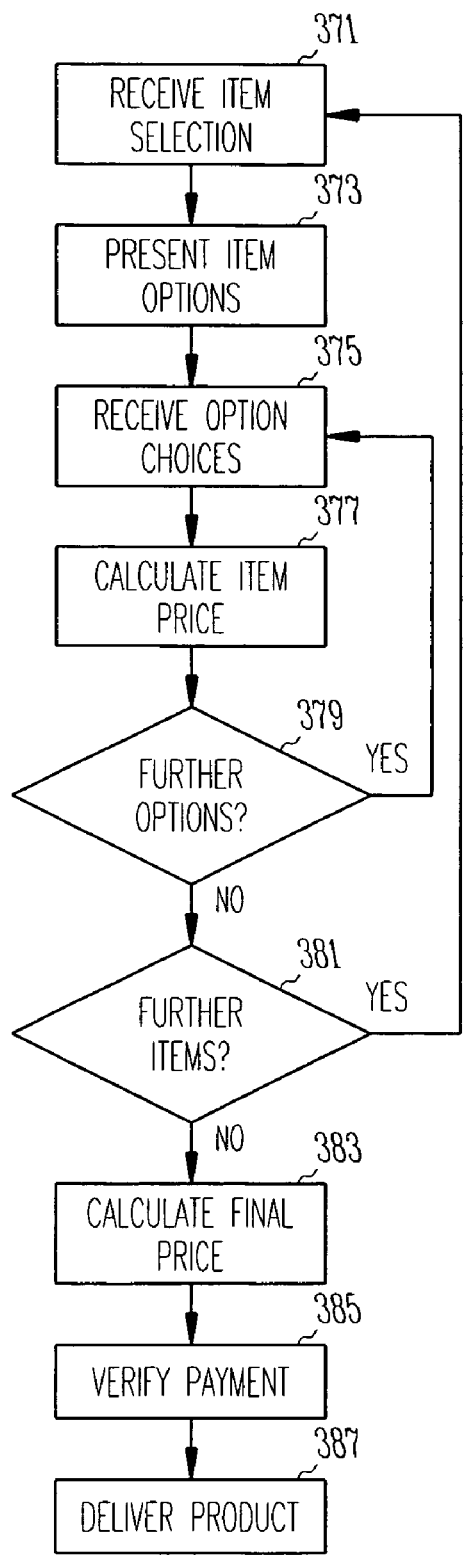
FIG. 3 is flow chart illustrating an alternative method of pricing digital content according to an embodiment of the present invention.

An example may be seen in FIG. 3, which is a flow chart illustrating an alternative method of pricing digital content, typically in the form of a digital content package, according to an embodiment of the present invention. The method may begin with receiving one or more items selected for prospective purchase at block 371, and then presenting associated digital content product options for purchase at block 373. The method may continue with receiving indications of one or more options chosen from the universe of options offered at block 375, and then calculating the item price at block 377. In one embodiment, a user agent may solicit and process the choices to calculate the item price. Pricing meta-data descriptors may be used to define base and option prices, as well as various adjustment factors. Formula meta-data descriptors may be used to define various pricing formulae. Any number of the meta-data descriptors may be included in the digital content package. After all options and items are selected for purchase (at blocks 379 and 381), and the final product price is calculated (at block 383), payment may be verified at block 385, and the product (i.e., the digital content package) may be delivered, typically to a consumer terminal or computer, at block 387.

Thus, referring back to FIG. 1, it is now easily understood that another embodiment of the invention may include an article comprising a machine-accessible medium (e.g., a memory, disk drive, etc.) having associated data (e.g. program instructions), wherein the data, when accessed, results in a machine performing certain actions. Such activity may include selecting a digital content item associated with a base price, selecting at least one configuration option associated with the digital content item and the option price, and calculating a final price related to the base price and the option price by a final pricing formula.

The machine-accessible medium may include other data, which when accessed by the machine, results in the machine recording selected configuration options, selecting option adjustment factors associated with the selected configuration options, and modifying the final pricing formula to include the selected option adjustment factors. As noted above, non-item specific adjustment factors may also be selected, and used to modify the final pricing formula to include the non-item specific adjustment factor.

The apparatus, system, article, and method of the invention operate to provide the flexibility desired by consumers, without generating an inordinate amount of unique configuration information. A large number of potential configurations may be generated using a minimal starting data set. In addition, configuration information may be retained as an integral part of each generated configuration, in order to simplify upgrade and/or additional purchase activity.

Although specific embodiments have been illustrated and described herein, those of ordinary skill in the art appreciate that any arrangement which is calculated to achieve the same purpose may be substituted for the specific embodiment shown. This disclosure is intended to cover any and all adaptations or variations of the present invention. It is to be understood that the above description has been made in an illustrative fashion, and not a restrictive one. Combinations of the above embodiments, and other embodiments not specifically described herein will be apparent to those of skill in the art upon reviewing the above description. The scope of the invention includes any other applications in which the above structures and methods are used. The scope of the invention should be determined with reference to the appended claims, along with the full range of equivalents to which such claims are entitled.

What is claimed is:

1. A digital content pricing system, comprising:
   a sales computer that calculates a final price; and
   a memory communicatively coupled with the sales computer, including a plurality of digital content items; wherein each one of the plurality of digital content items is associated with a base price and at least one item configuration option associated with an option price, wherein at least one item configuration option includes reducing a final price for a digital content item if advertising is included in the digital content item;
   wherein the sales computer calculates the final price by:
   determining, for one of the plurality of digital content items, the final price related to the base price and the option price by a final pricing formula ITEMPRICEA=ADJA*[BASEA+(OA1*PA1)+(OA2*PA2)+(OA3*PA3)], wherein BASEA is the base price for a selected digital content item A, ADJA is an item price adjustment factor for digital content item A, the values OA1, OA2, and OA3 are prices for individual options associated with digital content item A, and the factors PA1, PA2, and PA3 are option-specific price adjustment factors associated with the options OA1, OA2, and OA3; and
   wherein OA1 is an option price for including advertising in the selected digital content item A.

2. The digital content pricing system of claim 1, wherein the memory includes a plurality of pricing formulae including the final pricing formula.

3. The digital content pricing system of claim 1, wherein at least one of the plurality of digital content items is associated with a plurality of configuration options, including the at least one item configuration option.

4. A digital content pricing system, comprising:
   a sales computer that calculates a final price;
   a purchase computer communicatively coupled with the sales computer; and
   a memory communicatively coupled with the sales computer, including a plurality of digital content items, wherein each one of the plurality of digital content items is associated with a base price and at least one item configuration option associated with an option price, wherein at least one item configuration option includes reducing a final price for a digital content item if advertising is included in the digital content item;
   wherein the sales computer calculates the final price by:
   determining, for one of the plurality of digital content items, the final price related to the base price and the option price by a final pricing formula ITEMPRICEA=ADJA*[BASEA+(OA1*PA1)+(OA2*PA2)+(OA3*PA3)], wherein BASEA is the base price for a selected digital content item A, ADJA is an item price adjustment factor for digital content item A, the values OA1, 0A2, and OA3 are prices for individual options associated with digital content item A, and the factors PA1, PA2, and PA3 are option-specific price adjustment factors associated with the options OA1, OA2, and OA3; and
   wherein OA1 is an option price for including advertising in the selected digital content item A.

5. The digital content pricing system of claim 4, wherein the memory includes a plurality of pricing formulae including the final pricing formula.

6. The digital content pricing system of claim 4, wherein at least one of the plurality of digital content items is associated with a plurality of configuration options, including the at least one item configuration option.

7. The digital content pricing system of claim 4, further comprising:
   an item selection device capable of being communicatively coupled to the purchase computer.

* * * * *

UNITED STATES PATENT AND TRADEMARK OFFICE
CERTIFICATE OF CORRECTION

PATENT NO. : 7,383,207 B2 Page 1 of 1
APPLICATION NO. : 10/027420
DATED : June 3, 2008
INVENTOR(S) : Schwartz et al.

It is certified that error appears in the above-identified patent and that said Letters Patent is hereby corrected as shown below:

On the Title page, item (56), under "Other Publications", in column 2, line 1, delete "Fourt" and insert -- Fourth --, therefor.

In column 8, line 33, in Claim 4, delete "0A2," and insert -- OA2, --, therefor.

Signed and Sealed this

Sixteenth Day of September, 2008

JON W. DUDAS
*Director of the United States Patent and Trademark Office*